US011018866B2

(12) United States Patent
Kotwal et al.

(10) Patent No.: US 11,018,866 B2
(45) Date of Patent: May 25, 2021

(54) DYNAMIC SECOND FACTOR AUTHENTICATION FOR COOKIE-BASED AUTHENTICATION

(71) Applicant: Cisco Technology, Inc., San Jose, CA (US)

(72) Inventors: James Anil Pramod Kotwal, Austin, TX (US); Christopher Blayne Dreier, Austin, TX (US); David Aaron Wyde, Austin, TX (US); Kellen Mac Arb, Austin, TX (US); David McGrew, Poolesville, MD (US); Scott Fluhrer, North Attleboro, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/163,885

(22) Filed: Oct. 18, 2018

(65) Prior Publication Data

US 2019/0052462 A1 Feb. 14, 2019

Related U.S. Application Data

(62) Division of application No. 14/800,813, filed on Jul. 16, 2015, now Pat. No. 10,158,487.

(51) Int. Cl.
*H04L 9/08* (2006.01)
*H04L 9/32* (2006.01)
*H04L 29/06* (2006.01)

(52) U.S. Cl.
CPC .............. *H04L 9/32* (2013.01); *H04L 9/0819* (2013.01); *H04L 9/0869* (2013.01); *H04L 9/3226* (2013.01); *H04L 63/06* (2013.01); *H04L 63/1441* (2013.01); *H04L 63/168* (2013.01); *H04L 2463/082* (2013.01)

(58) Field of Classification Search
CPC ......... H04L 9/32; H04L 9/0819; H04L 63/06; H04L 63/1441; H04L 63/168; H04L 2463/082
USPC ........................................................ 713/167
See application file for complete search history.

(56) References Cited

U.S. PATENT DOCUMENTS

| 5,230,047 | A | * | 7/1993 | Frey, Jr. ................. G06F 16/13 714/4.1 |
| 6,141,758 | A | | 10/2000 | Benantar et al. |
| 6,160,890 | A | | 12/2000 | Tatebayashi et al. |
| 6,636,966 | B1 | | 10/2003 | Lee et al. |
| 7,222,101 | B2 | | 5/2007 | Bishop et al. |

(Continued)

OTHER PUBLICATIONS

Putthacharoen, et al., "Protecting Cookies from Cross Site Script Attacks Using Dynamic Cookies Rewriting Technique," IEEE, 13th International Conference on Advanced Communication Technology (ICACT), Feb. 2011, pp. 1090-1094.

*Primary Examiner* — Matthew T Henning
(74) *Attorney, Agent, or Firm* — Edell, Shapiro & Finnan, LLC (57) ABSTRACT

A server sends information to a client that allows the client to establish a first key at the client. The server then receives a session ID that has been encrypted using the first key. The first key is then established at the server, which can then decrypt the session ID using the first key. After the server validates the session ID, it determines a second key that is different from the first key. The server then receives the session ID encrypted with the second key, and decrypts the session ID encrypted with the second key.

20 Claims, 9 Drawing Sheets

(56) References Cited

U.S. PATENT DOCUMENTS

| | | |
|---|---|---|
| 7,346,773 B2 | 3/2008 | Cam-Winget et al. |
| 7,373,502 B2 | 5/2008 | McGrew |
| 7,493,331 B2 | 2/2009 | McGrew |
| 7,508,609 B2 | 3/2009 | Boyton et al. |
| 7,730,521 B1 | 6/2010 | Thesayi et al. |
| 7,852,861 B2 | 12/2010 | Wu et al. |
| 7,965,701 B1 | 6/2011 | Toennis et al. |
| 8,086,850 B2 | 12/2011 | Ghosh |
| 8,143,995 B2 | 3/2012 | Soppera et al. |
| 8,166,301 B2 | 4/2012 | Cam-Winget et al. |
| 8,341,417 B1 | 12/2012 | McGrew |
| 8,503,681 B1 | 8/2013 | McGrew et al. |
| 8,539,236 B2 | 9/2013 | Jeong et al. |
| 8,953,794 B1 | 2/2015 | Graube |
| 9,071,429 B1* | 6/2015 | Roth ............... H04L 9/0894 |
| 9,350,533 B2 | 5/2016 | Oliver |
| 2001/0016907 A1 | 8/2001 | Kang et al. |
| 2002/0094085 A1 | 7/2002 | Roberts |
| 2002/0181506 A1* | 12/2002 | Loguinov ............ H04L 1/1671 |
| | | 370/473 |
| 2004/0128501 A1 | 7/2004 | Yamamoto et al. |
| 2006/0129847 A1* | 6/2006 | Pitsos ............... H04L 9/3236 |
| | | 713/193 |
| 2007/0106894 A1* | 5/2007 | Zhang ............... H04W 12/06 |
| | | 713/170 |
| 2009/0245516 A1 | 10/2009 | Ravikiran |
| 2010/0017596 A1 | 1/2010 | Schertzinger |
| 2010/0161966 A1 | 6/2010 | Kwon et al. |
| 2010/0254533 A1 | 10/2010 | McCullough et al. |
| 2013/0132718 A1* | 5/2013 | Agrawal ............ H04L 9/3268 |
| | | 713/158 |
| 2014/0101449 A1 | 4/2014 | Trujillo Gonzalez et al. |
| 2014/0289525 A1* | 9/2014 | Agrawal ............ H04L 9/0822 |
| | | 713/171 |
| 2017/0019423 A1 | 1/2017 | Kotwal et al. |

* cited by examiner

DYNAMIC SECOND FACTOR AUTHENTICATION FOR COOKIE-BASED AUTHENTICATION

CROSS-REFERENCE TO RELATED APPLICATIONS

This application is a divisional of U.S. patent application Ser. No. 14/800,813, filed Jul. 16, 2015, the entire contents of which is incorporated herein by reference.

TECHNICAL FIELD

The present disclosure relates to information security.

BACKGROUND

Hypertext Transfer Protocol (HTTP) cookies are an important part of trust on the web. Users often trade their login credentials for a cookie, which is then used to authenticate subsequent requests. Cookies are valuable to attackers: passwords can be fortified by two-factor authentication and "new login location detected" emails, but session cookies typically bypass these measures.

When a user authenticates to a website, the user may be given a token. The token can then be presented to the web server by the user along with subsequent requests to prove the identity of the user. The token usually takes the form of a number, called a session identifier (ID), stored in a cookie. A cookie is generally a text file or database entry. A malicious third party, using various means, can steal the cookie data and impersonate the user for as long as the cookie is valid. Cookies often remain valid for extended periods of time, on the order of weeks in some cases.

Malicious third parties may steal cookies in two ways: at rest and in transit. To steal a cookie at rest (i.e., while the cookie is stored in memory), an attacker steals the cookie from the user's computing device. This can be a result of a browser vulnerability or through direct access to the computing device. To steal a cookie in transit, an attacker must generally intercept the traffic between the user and server. Cookies are usually transmitted over secure channels, wherein the cookies are encrypted. To steal a cookie in transit, an attacker needs to generally compromise the encryption scheme.

DESCRIPTION OF EXAMPLE EMBODIMENTS

Overview

In an embodiment, a server sends information to a client that allows the client to establish a first key at the client. The server then receives a session ID that has been encrypted using the first key. The first key is then established at the server, which can then decrypt the session ID using the first key. After the server validates the session ID, it determines a second key that is different from the first key. The server then receives the session ID encrypted with the second key, and decrypts the session ID encrypted with the second key.

Example Embodiments

Presented herein are a system and method whereby a pseudorandom number generator (PRNG) is used to add a second factor of authentication to session cookies. The cookie becomes dynamic, valid for brief periods of time. This provides protection against the reuse of cookies both at rest and in transit by limiting the cookie lifetime.

Figure 1:
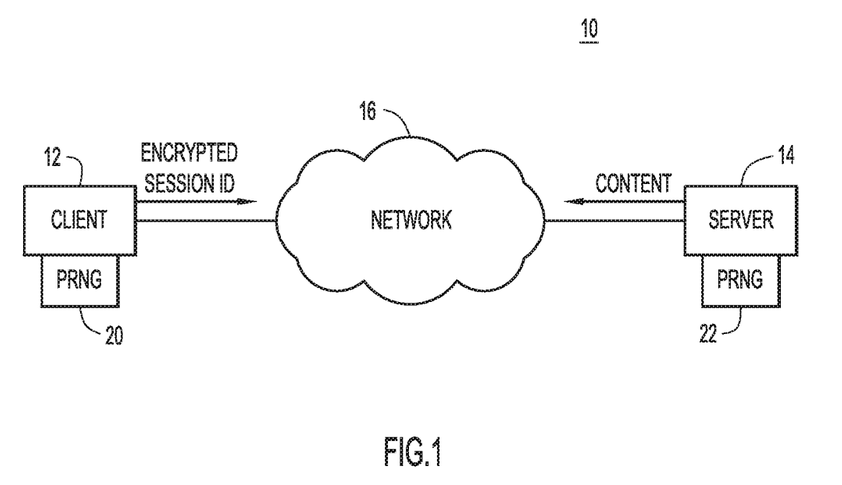
FIG. 1 is a high-level system diagram according to an example embodiment.

FIG. 1 is a high-level diagram of a system 10. The system includes a client 12 and a server 14, which can communicate with each other by way of network 16. The client 12 includes a pseudorandom number generator (PRNG) 20 and the server 14 includes a PRNG 22.

Figure 2:
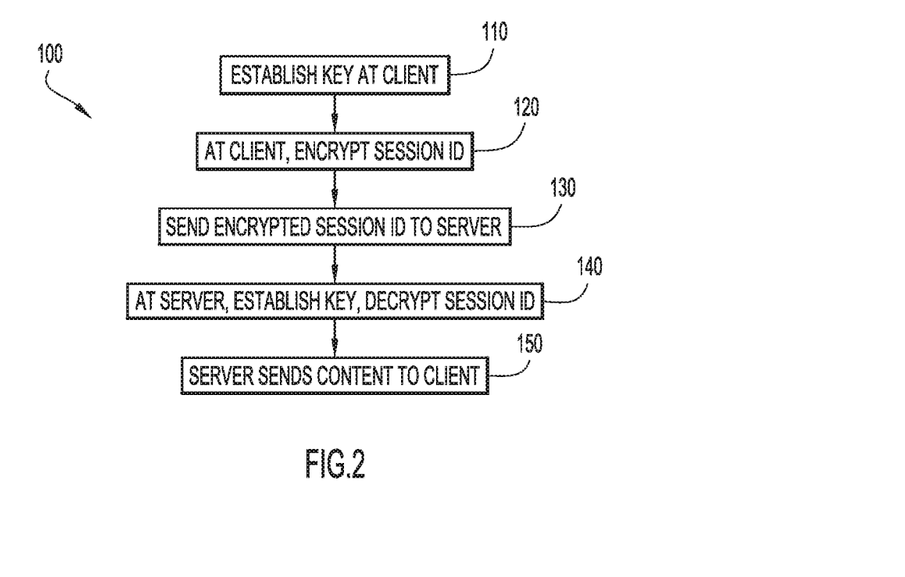
FIG. 2 is a flowchart illustrating processing of the system described herein, according to an embodiment.

Processing for the system shown in FIG. 1 is now described with respect to FIG. 2, according to an embodiment. Further details are described in connection with subsequent figures. Once a login or authentication process has been completed between the client 12 and server 14, and a session ID has been established at the server 14 and provided to the client, a cryptographic key is established at the client at 110. At 120, the session ID is encrypted at the client using the key. At 130, the encrypted session ID is sent from the client to a server. This prevents a malicious third party from accessing the session ID. Such a party cannot read the encrypted session ID, and cannot re-create the encrypted session ID without access to the key. At 140, a cryptographic key is established at the server 14, and used to decrypt the received session ID. As will be described below, this key will be the same as that used by the client when the encryption scheme is symmetric. At 150, the server 14 sends the requested content to the client 12 once the session ID has been successfully decrypted and validated.

Figure 3:
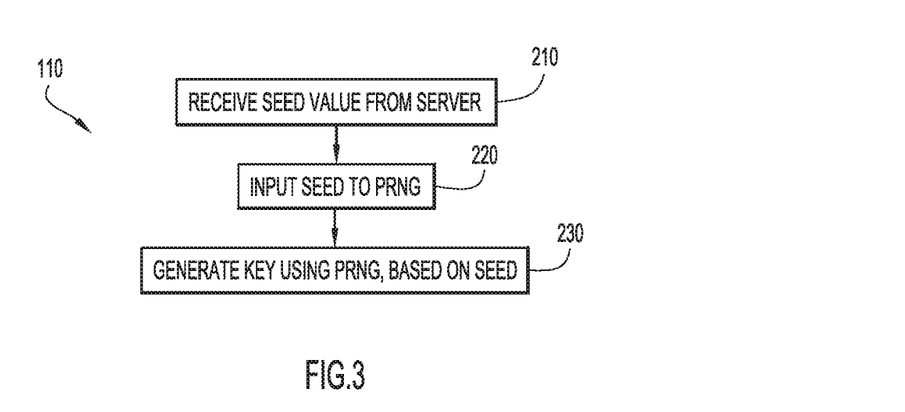
FIG. 3 is a flowchart illustrating processing at a client, according to an embodiment.

The establishment of the cryptographic key at the client (operation 110 in FIG. 2) is illustrated in greater detail in FIG. 3, according to an embodiment. At 210, a seed value is received from the server. In an embodiment, the seed value may be generated by the server using a random number generator. This random number generator is deterministic. The seed may be transmitted in a secure manner, e.g., using the secure hypertext transfer protocol (HTTPS). At 220, the seed value may be input to the PRNG at the client. At 230, a cryptographic key is generated using the PRNG, based on this seed value. The PRNG may be a deterministic function that generates a continual stream of binary data based on the seed. The PRNG output may be a linear recursive sequence and/or may be generated in part by a known cryptographic algorithm, such as the Data Encryption Standard (DES), the Advanced Encryption Standard (AES), or by a chaotic generator. These possibilities represent examples and are not meant to be limiting. In an embodiment, the PRNG operates continually; the output of the PRNG may be tapped as necessary when a key is needed. The key can then be used by the client to encrypt the session ID before sending the session ID to the server. The encryption process may include any cryptographic algorithm known in the art. When a subsequent request to the server is made within the same session, the output of the PRNG may again be tapped to obtain data to be used as the next key. This next key may then be used to encrypt the session ID in the subsequent request.

Figure 4:
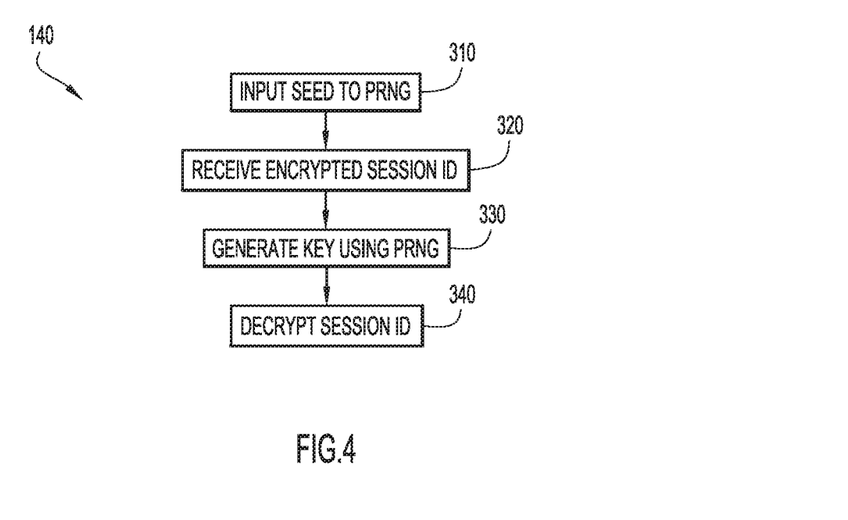
FIG. 4 is a flowchart illustrating processing at a server, according to an embodiment.

Further details of the processing during step 140 shown in FIG. 2 at the server are illustrated in FIG. 4, according to an embodiment. At 310, the seed is input to a PRNG at the server. In an embodiment, this PRNG is functionally identical to the PRNG at the client. After initialization with the same seed, both PRNGs generate the same binary sequence. At 320, the encrypted session ID is received from the client. At 330, the cryptographic key is generated using the server's PRNG. The PRNG at the server is synchronized with the PRNG at the client, so that the outputs of the two devices may be identical at any given point in time when synchronization is maintained. At 340, the session ID is decrypted using the key.

Figure 5:
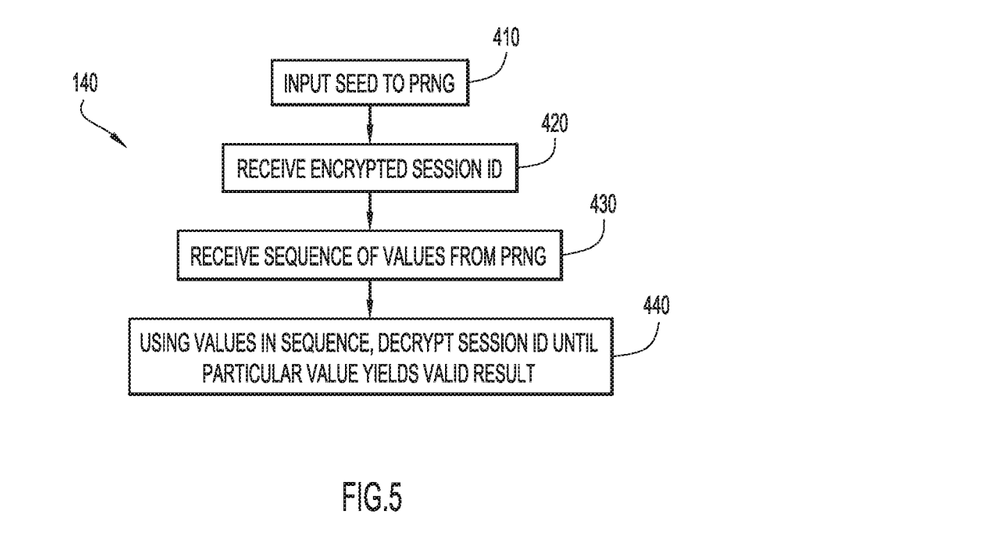
FIG. 5 is a flowchart illustrating processing at a server, according to an alternative embodiment.

While the PRNG at the client and the PRNG at the server may be approximately synchronized such that their outputs are the same at any particular time, precise synchronization may be difficult to assure. In an embodiment, the PRNG at the server may generate a sequence of values, outputs of the PRNG, over time. When decryption of a session ID is necessary, a sequence of consecutive outputs may be read from the PRNG, where each output is tried as a key in the decryption process. This is illustrated in FIG. 5, which shows a flow chart for the details of operation 140 of FIG. 2, according to another embodiment. At 410, the seed is input to the PRNG at the server. At 410, the encrypted session ID is received at the server from the client. At 430, a sequence of consecutive values is received from the server's PRNG. At 440, the encrypted session ID is decrypted with each of the values in the sequence, until a particular decrypted value represents a valid result. Validity may be determined using a checksum or other more robust error detection mechanisms, as is known in the art.

In an alternative embodiment, a timestamp and/or a key identifier may be provided by the client to the server along with the encrypted session ID, as a way of informing the server the state of the client's PRNG. The timestamp may then be used by the server to synchronize its PRNG or otherwise obtain a PRNG output corresponding to the key used by the client. In such an embodiment, the session ID (or its cookie) and the timestamp may be tagged with a message authentication code (MAC). When the client sends the session ID back, it sends it with the timestamp (and/or the key identifier), along with the MAC of the session ID. In this way, the server can decide whether the declared clock drift is too much.

Figure 6:
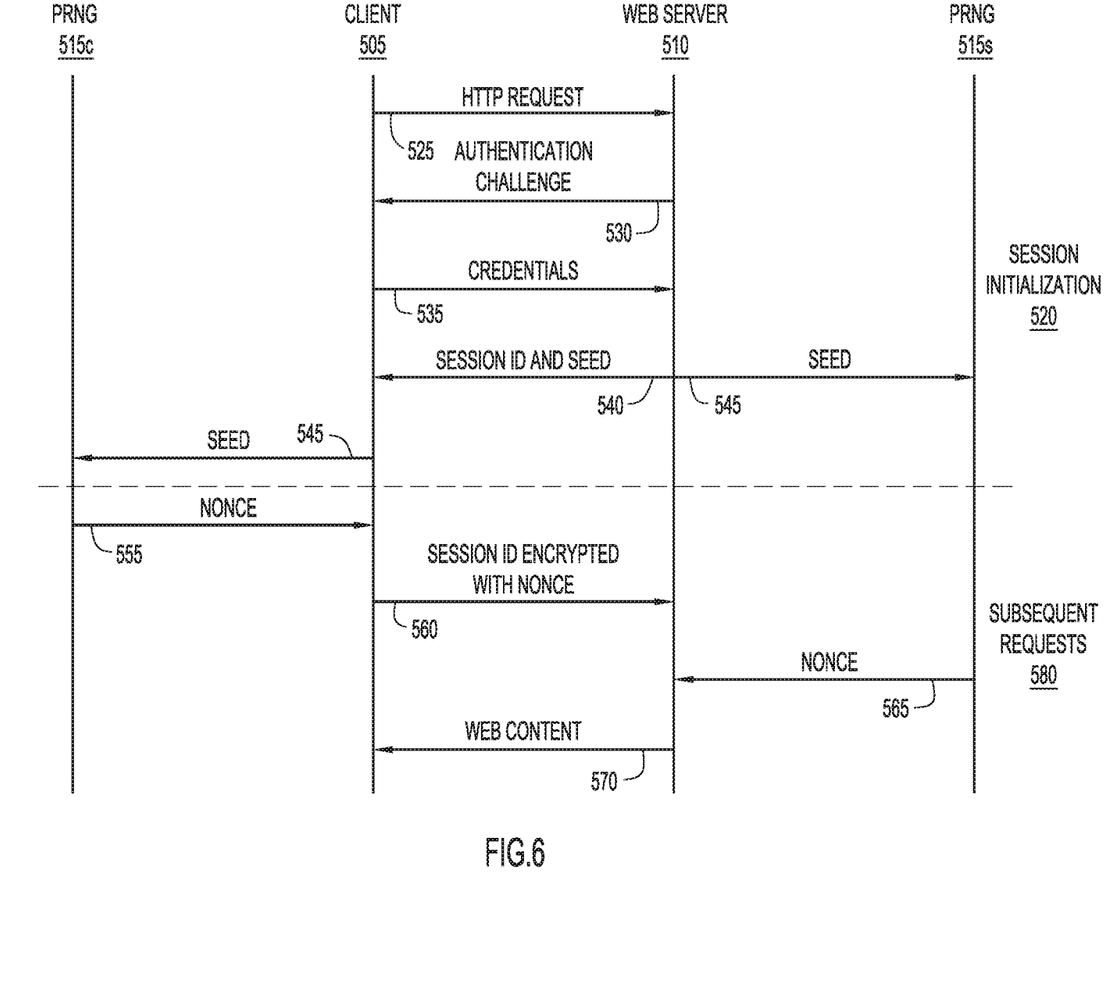
FIG. 6 illustrates the interaction between a client and a server, according to an embodiment.

The above interaction between a client and server is illustrated in the context of a content request shown in FIG. 6, according to an embodiment. A client 505 is shown in communication with a server 510. The server 510 may be a web server, for example and without limitation. Client 505 includes (or otherwise has access to) a PRNG 515*c*. The server 510 includes or has access to a PRNG 515*s*. Initially, the client 505 sends a request to server 510. The request is shown as an HTTP request 525. This request may be seeking web content, for example. The server 510 may then issue an authentication challenge 530 to the client 505. In response, the client 505 may return credentials 535 to the server 510. The server 510 sends a session ID and seed value in transmission 540 to the client 505. The server 510 provides the seed value 545 to its PRNG 515*s*. The client 505 provides the same seed value 545 to its PRNG 515*c*. The output of the PRNG 515*c* is shown as nonce 555, which may be used as a cryptographic key. The client 505 may then encrypt the session ID using the nonce 555, resulting in the encrypted session ID 560. The encrypted session ID 560 is received at the server 510. The PRNG 515*s* may similarly generate a nonce 565 to be used as a decryption key. When nonce 565 is the same as nonce 555, the web server 510 may use the nonce 565 to decrypt the session ID 560. If the session ID, as decrypted, proves to be valid, the web server 510 may then provide web content 570 the client 505. Various mechanisms may be used to assure that the nonce 565 is the same as the nonce 555, as discussed above. In this context a nonce is a "random value" and it is not meant to restrict the embodiments disclosed herein to handle the nonce value in a particular way.

In a subsequent request 580 from client 505 in the same session, the client 505 will again obtain a new nonce from its PRNG 515*c*, where this nonce is used as an encryption key for the session ID. The encrypted session ID will then be sent to server 510, where a nonce will be obtained from its PRNG 515*s*. Where synchronization is attained between the PRNGs, the nonces will match, so that the server 510 will have the same nonce (i.e., key) as the client 505. This allows the server 510 to decrypt the session ID in this subsequent request.

Figure 7:
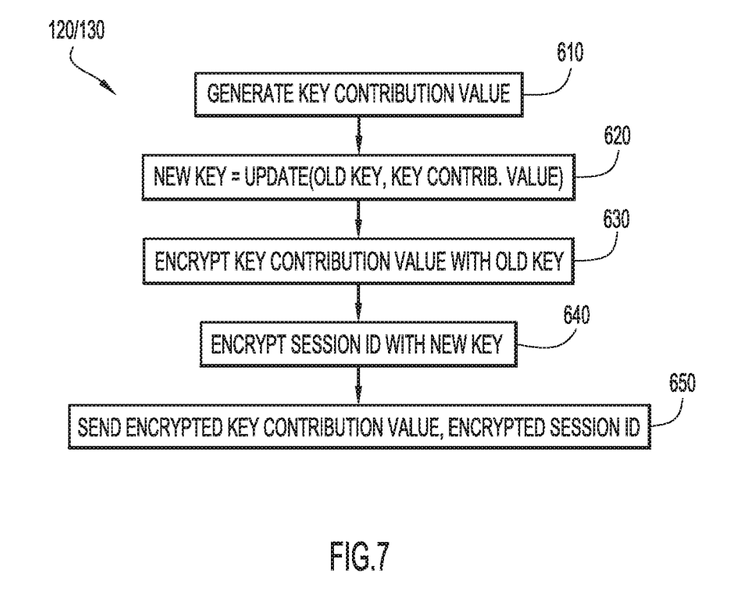
FIG. 7 is a flowchart illustrating processing at a client, according to an alternative embodiment.

In the above embodiments, the session ID is encrypted (e.g., at operations 120/130 in FIG. 1) with a cryptographic key that changes for every client request, where each new key is the output of a PRNG. In alternative embodiments, different mechanisms may be used to change the cryptographic key. One such embodiment is illustrated in FIG. 7. At 610, the client may generate a random key contribution value. The key contribution value may be produced by a random noise source, for example, or by a deterministic pseudorandom process. At 620, an update process is executed at the client, wherein a new key is generated as a function of the previous ("old") key and the key contribution value. In an embodiment, the new key may be a mod-2 bitwise sum of the key contribution value and the old key, for example and without limitation; other update processes may also be used. At 630, the key contribution value is encrypted by the client using the previous key or another previously agreed upon key. At 640, the session ID is encrypted by the client using the new key generated by the update. At 650, the encrypted key contribution value and the encrypted session ID are sent from the client to the server.

Figure 8:
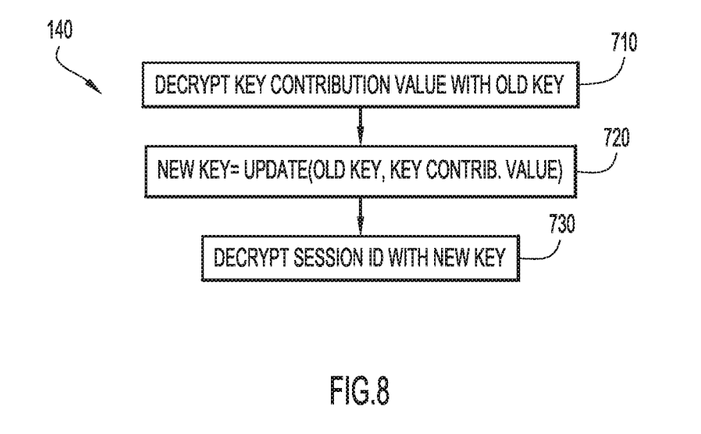
FIG. 8 is a flowchart illustrating processing at a server, according to an alternative embodiment.

The details of processing at the server (at step 140 of FIG. 2) are illustrated in FIG. 8 for this embodiment. At 710, the received key contribution value is decrypted using the previous key (or another previously agreed upon key). At 720, the update is executed at the server, with the key contribution value and the old key as inputs. The output of this function is the new key. At 730, the session ID is decrypted using the new key.

In an embodiment, the encryption and decryption processes for the session ID may be the same as those used for the encryption and decryption of the key contribution value. In other words, the encryption algorithm may be the same for both the session ID and for the key contribution value. In alternative embodiments, different encryption algorithms may be used for each.

In subsequent requests from the client during the current session, this process may be repeated. The client would generate another key contribution value, and use it to update the previous key and thereby generate a new key. The new key would then be used by the client to encrypt the session ID for the subsequent request. As before, the encrypted session ID would be sent to the server. The key contribution value would also be sent securely to the server, which would use the key contribution value to update the old key. The server would use the resulting new key to decrypt the encrypted session ID from the client.

Figure 9:
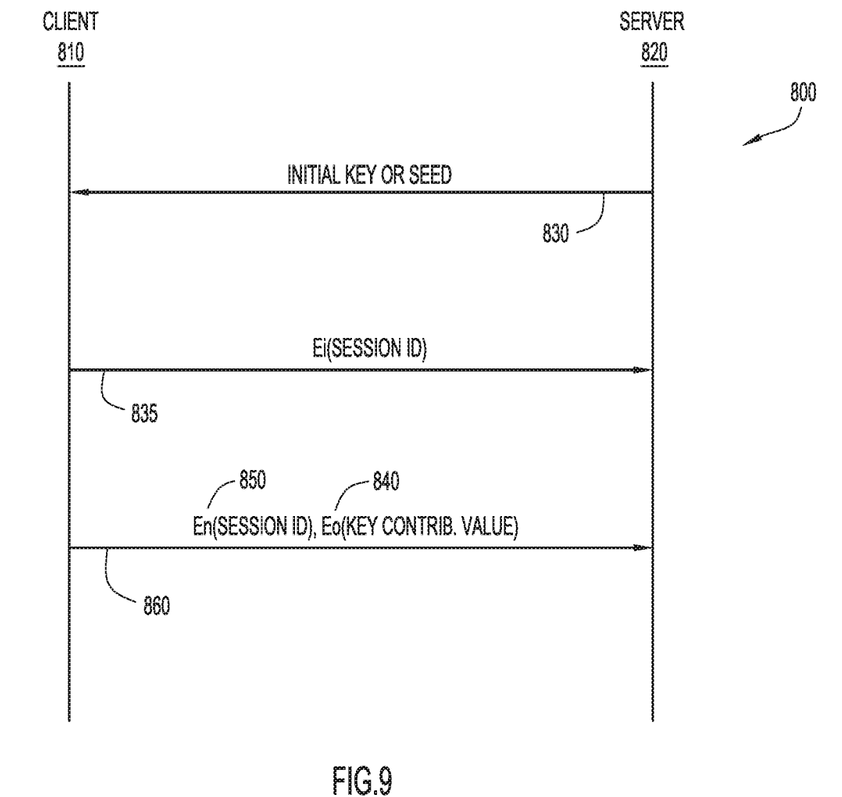
FIG. 9 illustrates the interaction between a client and a server, according to an alternative embodiment.

With reference to FIG. 9, an interaction 800 between a client shown at reference numeral 810 and a server shown at reference numeral 820 is now described. Client 810 is in communication with the server 820. The server 820 first provides an initial key or seed value 830 to the client 810. As in previous embodiments, the initial key or seed 830 may be sent to the client using the HTTPS protocol. The initial key or seed 830 may be used by client 810 to encrypt the first request of the session; alternatively, the first encryption key may be some function of the initial key or seed 830. The client 810 then encrypts the session ID and sends the result 835 to server 820 in the first request of the session. This initial encrypted value is shown as Ei (session ID) at reference numeral 835 in FIG. 9. For the next request in the session, the client 810 will have generated a key contribution value. The client 810 would use the last ("old") key or another previously agreed-upon key to encrypt this key contribution value, as shown by operation Eo in FIG. 9, producing a result 840. The client 810 would generate a new key using the update process, the old key, and the key contribution value. The session ID is encrypted using the new key, operation En in FIG. 9, producing a result 850. At 860, these two encrypted values 840 and 850 are then sent to the server 820.

In accordance with another embodiment, the server can store a random key that it uses in a pseudorandom function, such as a hash message authentication code (HMAC) function, and then generate a per-client key by choosing a nonce that it sends to the client. An HMAC is a specific construction for calculating a message authentication code (MAC) involving a cryptographic hash function in combination with a secret cryptographic key. The server computes the HMAC of the nonce with that key. The per-client key is the output of the HMAC function, HMAC (random_key, nonce). By sending the nonce to the client, and having the client return the nonce, the server (and only the server) can re-compute the per-client key on demand. In this way, the server can avoid storing the per-client key, and need only store the key for the pseudorandom function. Thus, returning of the nonce to the server enables re-computation of the key by the server.

First, consider the case (not using this embodiment) in which the client and server share a key K, and both the client and the server store the key. In this case, the client can send the server an encrypted message, and the server can decrypt the message:
1. Client encrypts message M using key K.
2. Client sends encrypted message E (K, M) to server.
3. Server decrypts E (K,M) using key K.

Figure 10:
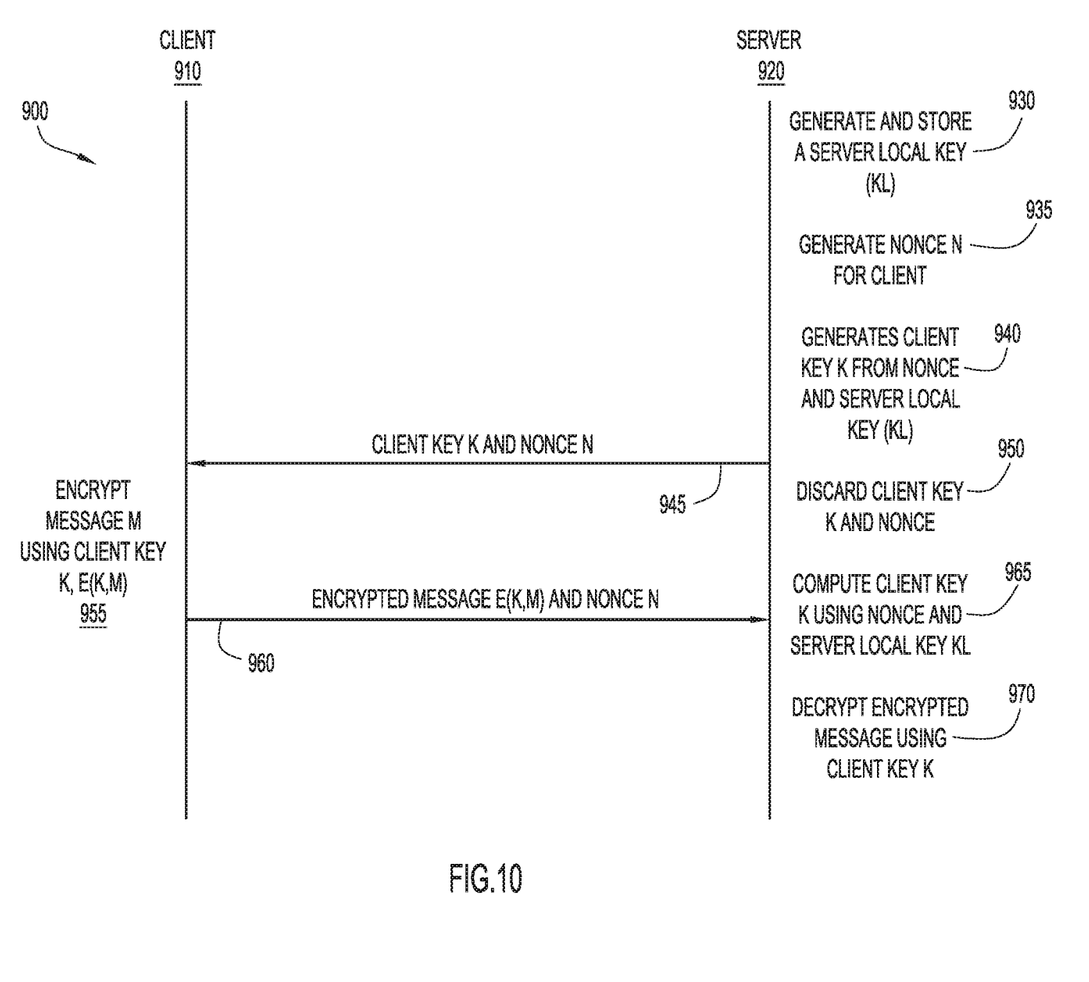
FIG. 10 is a sequence diagram illustrating an operation flow between a client and a server according to still another example embodiment.

Reference is now made to FIG. 10. FIG. 10 shows an operational flow 900 between a client 910 and a server 920 according to an embodiment that enables the server to avoid storing a key K for each client. If there are millions of clients, and hundreds of servers, then it would be a substantial inconvenience to manage all of those keys for each client. Instead, the server creates a local key, KL, that it keeps for itself and does not share the local key with any other entity. The KL serves the same purpose as the random key described above, which is used to compute the per-client key using HMAC. The server then generates the client key from the local key as follows. At 930, the server 920 generates and stores a server local key, KL. At 935, the server 920 generates a nonce N for client 910 using a random or pseudorandom process. At 940, the server 910 generates client key K for client 910 as K=PRF (KL, N), where PRF is a pseudorandom function.

At 945, the server 920 sends the client 910 the client key K and nonce N. After the client has received the client key K and the nonce N, the server 910 can discard those values by freeing the memory that stored them as shown at 950. For example, the server 910 may free that memory once it received an acknowledgment from the client 910 that the client 910 received the message containing the client key K and nonce N, or after some time-out period.

When the client 910 wants to send the server 920 an encrypted message, the client 910 encrypts the message M using the client key K, as shown at step 955. At 960, the client 910 sends the encrypted message E (K, M) and the nonce N to server 920. At 965, the server 920 uses the nonce N to compute the client key K as K=PRF (KL, N), using the server local key, KL. At 970, the server 920 can then decrypt the encrypted message E (K,M) using the client key K that it computed at step 965.

It should be understood that the server repeats this operational flow with respect to each client that it communicates with. In other words, the server repeats the generating the nonce at 935, generating the client key at 940, sending the client key and the nonce at 945, receiving the encrypted message at 960, computing the client key at 965 and decrypting the encrypted message at 970, for each of a plurality of clients with a different client key for each of the plurality of clients.

Figure 11:
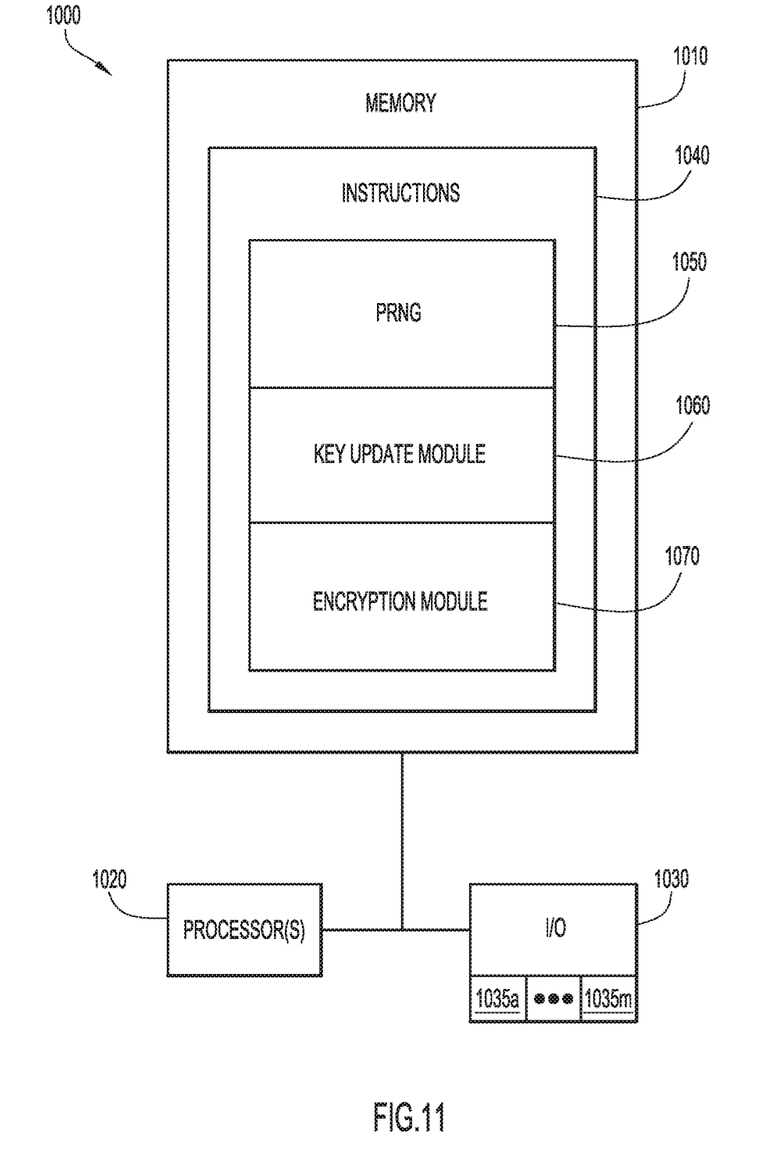
FIG. 11 illustrates a block diagram of a client computing system, according to an example embodiment.

The processing at a client described above may be implemented in one or more programmable processors executing software or firmware (or a combination thereof). A software or firmware embodiment of a suitable configured client is shown in FIG. 11. A client computing system 1000 includes one or more memory devices, shown collectively as memory 1010. Memory 1010 is in communication with one or more processors 1020 and with one or more input/output units 1030. An example of an I/O unit is a network processor unit that may have associated network ports or other communications ports 1035a-1035m. In an embodiment, I/O 1030 allows the client to communicate with other entities in a network, such as a server. The I/O 1030 may include one or more Application Specific Integrated Circuits (ASICs) that are configured with digital logic gates to perform various networking and security functions. In an embodiment, the client computing system 1000 may be embodied in any computing system or device acting as a client.

Memory 1010 may include, but is not limited to, read only memory (ROM), random access memory (RAM), magnetic disk storage media devices, optical storage media devices, flash memory devices, electrical, optical, or other physically tangible (i.e., non-transitory) memory storage devices. Memory 1010 stores data as well as executable instructions 1040. Instructions 1040 are executable on processor(s) 1020. The processor(s) 1020 comprise, for example, a microprocessor or microcontroller that executes instructions 1040. Thus, in general, the memory 1010 may comprise one or more tangible (non-transitory) computer readable storage media (e.g., memory device(s)) encoded with software or firmware that comprises computer executable instructions. When the instructions are executed (by the processor(s)

1020) the software or firmware is operable to perform the client operations described herein.

In the illustrated embodiment, the executable instructions 1040 may include several logic modules. These include a PRNG module 1050, responsible for producing a pseudo-random data stream; the data from this stream may be used as cryptographic keys, as described above. The instructions 1040 may also include a key update module 1060, responsible for generating key contribution values and embodying an update process that yields a new key. Instructions 1040 may also include an encryption module 1070 for encrypting session IDs and, in certain embodiments, key contribution values as noted above.

Figure 12:
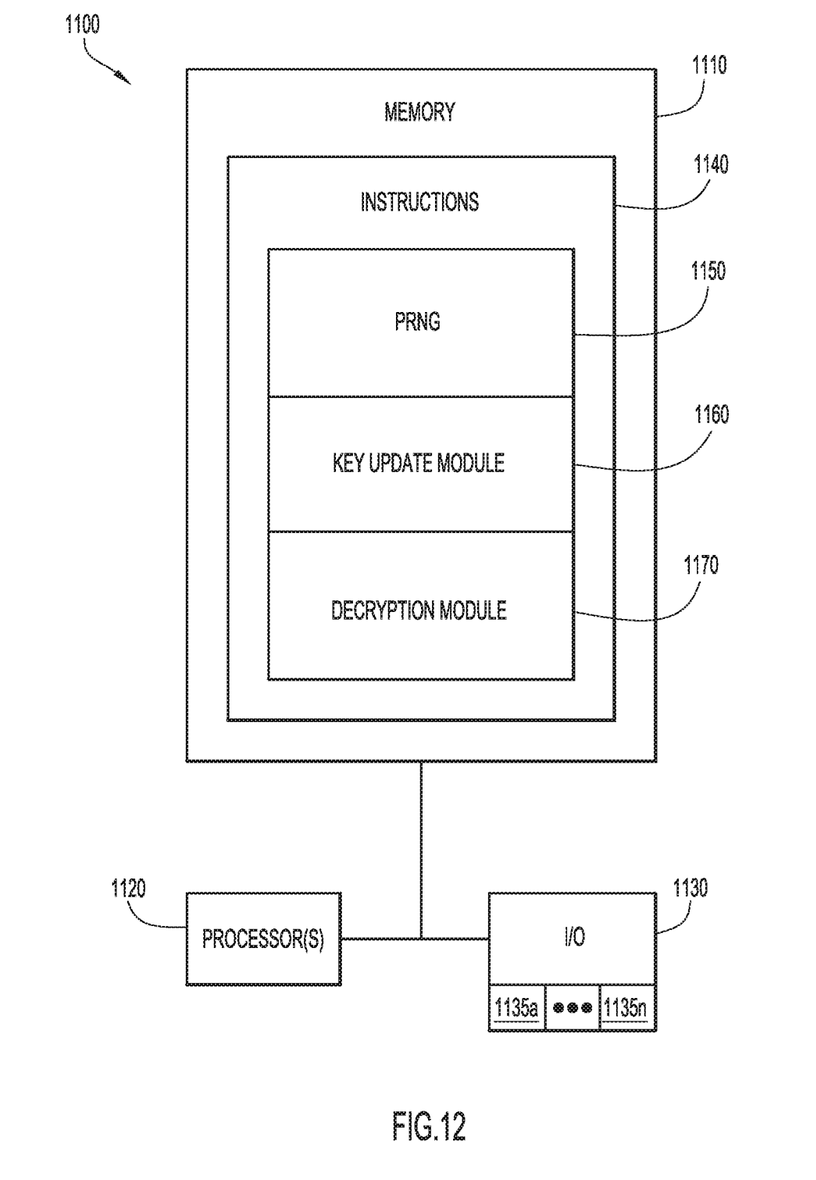
FIG. 12 illustrates a block diagram of a server computing system, according to an example embodiment.

The processing described above for a server may be implemented in one or more programmable processors executing software or firmware (or a combination thereof) at the server. A software or firmware embodiment of a server computing system is illustrated in FIG. 12. A server computing system 1100 includes one or more memory devices, shown collectively as memory 1110. Memory 1110 is in communication with one or more processors 1020 and with one or more input/output units 1130. An example of an I/O unit is a network processor unit that may have associated network ports or other communications ports 1135*a*-1135*n*. In an embodiment, I/O 1130 allows the server to communicate with other entities across a network, such as a client device or process. The I/O 1130 may include one or more ASICs that are configured with digital logic gates to perform various networking and security functions. In an embodiment, the system 1100 may be embodied in any computing system or device operating as a server.

Memory 1110 may include, but is not limited to, ROM, RAM, magnetic disk storage media devices, optical storage media devices, flash memory devices, electrical, optical, or other physically tangible (i.e., non-transitory) memory storage devices. Memory 1010 stores data as well as executable instructions 1140. Instructions 1140 are executable on processor(s) 1120. The processor(s) 1120 comprise, for example, a microprocessor or microcontroller that executes instructions 1140. Thus, in general, the memory 1110 may comprise one or more tangible (non-transitory) computer readable storage media (e.g., memory device(s)) encoded with software or firmware that comprises computer executable instructions. When the instructions are executed (by the processor(s) 1120) the software or firmware is operable to perform the operations described herein.

In the illustrated embodiment, the executable instructions 1140 may include several logic modules. These include a PRNG module 1150, responsible for generation of cryptographic keys. Instructions 1140 may also include a key update module 1160 responsible for updating a key using a received key contribution value as described above. Instructions 1140 may also include a decryption module 1170 responsible for decrypting encrypted session IDs or key contribution values.

To summarize, current systems for user authentication on the web are insecure. A malicious third party can steal a cookie and impersonate the end user until the session expires, often days or weeks. The system and methods presented herein use pseudorandom number generators to encrypt session data in transit using dynamic values, making session values much less valuable to attackers. As a result, cookies stolen in transit or through browser attacks will only be valid for a brief period of time, mitigating their value to attackers. Session IDs stolen from a user's hard disk cannot be used to authenticate a malicious third party. The session ID is useless without a valid nonce from a PRNG.

Thus, in method form, a method is provided in which a server sends information to a client that allows the client to establish a first key at the client. The server then receives a session ID that has been encrypted using the first key. The first key is then established at the server, which can then decrypt the session ID using the first key. After the server validates the session ID, it determines a second key that is different from the first key. The server then receives the session ID encrypted with the second key, and decrypts the session ID encrypted with the second key.

In another form, one or more computer readable non-transitory storage media are encoded with software comprising computer executable instructions that, when executed, are operable to send information to a client that allows the client to establish a first key at the client. The instructions are further operable to receive a session identifier (ID) that has been encrypted using the first key, establish the first key at the server, and decrypt the session ID using the first key. The instructions are further operable to validate the session ID. The instructions are further operable to determine a second key that is different from the first key, receive the session ID encrypted with the second key, and decrypt the session ID encrypted with the second key.

In still another form, an apparatus is provided comprising a processor and a network interface unit coupled to the processor. The processor is configured to send information to a client that allows the client to establish a first key at the client. The processor is further configured to receive a session ID that has been encrypted using the first key, establish the first key at the server, and decrypt the session ID using the first key. The processor is further configured to validate the session ID, and then determine a second key that is different from the first key, receive the session ID encrypted with the second key, and decrypt the session ID encrypted with the second key.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:

1. A method comprising:
    at a server, generating, using a pseudorandom number generator, a nonce for a client;
    generating a client key for the client based on the nonce and a server local key;
    providing the client key and the nonce to the client;
    obtaining, at the server, the nonce and an encrypted message from the client, the encrypted message having been encrypted by the client using the client key and including a session identifier;
    computing at the server the client key using the nonce and the server local key; and
    decrypting the encrypted message using the client key and obtaining the session identifier.

2. The method of claim 1, wherein the server local key is kept by the server and not shared.

3. The method of claim 1, further comprising the server discarding the client key and the nonce after providing the client key and the nonce to the client.

4. The method of claim 3, wherein providing the client key and the nonce includes providing, to the client, a message that includes the client key and the nonce, and wherein the server discards the client key and the nonce after receiving an acknowledgement from the client indicating that the client received the message that includes the client key and the nonce.

5. The method of claim 3, wherein the server discards the client key and the nonce after a predetermined time period elapses since providing the client key and the nonce to the client.

6. The method of claim 1, wherein generating the client key comprises generating the client key using a pseudorandom or random function.

7. The method of claim 1, further comprising repeating generating the nonce, generating the client key, providing the client key, obtaining the encrypted message, computing the client key, and decrypting the encrypted message for each of a plurality of clients with a different client key for each of the plurality of clients.

8. The method of claim 1, wherein providing the client key and the nonce to the client includes providing the client key and the nonce to the client using a secure hypertext transfer protocol.

9. An apparatus comprising:
an input/output unit that enables network communications;
a processor; and
a memory to store data and instructions executable by the processor,
wherein the processor is configured to execute the instructions to:
generate, using a pseudorandom number generator, a nonce for a client;
generate a client key for the client based on the nonce and a server local key;
provide the client key and the nonce to the client;
obtain the nonce and an encrypted message from the client, the encrypted message having been encrypted by the client using the client key and includes a session identifier;
compute the client key using the nonce and the server local key; and
decrypt the encrypted message using the client key and obtain the session identifier.

10. The apparatus of claim 9, wherein the server local key is kept by the apparatus and not shared.

11. The apparatus of claim 9, wherein the processor is configured to discard the client key and the nonce after providing the client key and the nonce to the client.

12. The apparatus of claim 11, wherein the processor is configured to discard the client key and the nonce after obtaining an acknowledgement from the client indicating that the client receives the client key and the nonce.

13. The apparatus of claim 11, wherein the processor is configured to discard the client key and the nonce after a predetermined time period elapses since providing the client key and the nonce to the client.

14. The apparatus of claim 9, wherein the processor is configured to generate the client key using a pseudorandom or random function.

15. The apparatus of claim 9, wherein the processor is configured to repeat generating the nonce, generating the client key, providing the client key, obtaining the encrypted message, computing the client key, and decrypting the encrypted message for each of a plurality of clients with a different client key for each of the plurality of clients.

16. A non-transitory computer-readable storage medium encoded with software comprising computer executable instructions which, when executed by a processor, cause the processor to:
generate, using a pseudorandom number generator, a nonce for a client;
generate a client key for the client based on the nonce and a server local key;
provide the client key and the nonce to the client;
obtain the nonce and an encrypted message from the client, the encrypted message having been encrypted by the client using the client key and including a session identifier;
compute the client key using the nonce and the server local key; and
decrypt the encrypted message using the client key and obtaining the session identifier.

17. The non-transitory computer-readable storage medium of claim 16, wherein the instructions cause the processor to discard the client key and the nonce after providing the client key and the nonce to the client.

18. The non-transitory computer-readable storage medium of claim 17, wherein the instructions cause the processor to discard the client key and the nonce after obtaining an acknowledgement from the client indicating that the client receives the client key and the nonce.

19. The non-transitory computer-readable storage medium of claim 17, wherein the instructions cause the processor to discard the client key and the nonce after a predetermined time period elapses since providing the client key and the nonce to the client.

20. The non-transitory computer-readable storage medium of claim 16, wherein the instructions cause the processor to generate the client key using a pseudorandom or random function.

* * * * *